United States Patent [19]

Nishida

[11] Patent Number: 5,317,649
[45] Date of Patent: May 31, 1994

[54] METHOD FOR CLASSIFYING LINE PATTERNS OF CHARACTERS IN DICTIONARY

[75] Inventor: Hirobumi Nishida, Sagamihara, Japan

[73] Assignee: Ricoh Company, Ltd., Tokyo, Japan

[21] Appl. No.: 798,319

[22] Filed: Nov. 26, 1991

[30] Foreign Application Priority Data

Nov. 30, 1990 [JP] Japan .................... 2-339695

[51] Int. Cl.$^5$ .................... G06K 9/46; G06K 9/48
[52] U.S. Cl. .................... 382/21; 382/22; 382/24
[58] Field of Search .................... 382/10, 19-22, 382/24-26, 48; G06K 9/00, 9/46, 9/66, 9/50, 9/48, 9/20

[56] References Cited

U.S. PATENT DOCUMENTS

| | | | |
|---|---|---|---|
| 4,493,105 | 1/1985 | Beall | 382/21 |
| 4,566,124 | 1/1986 | Yamamoto | 382/21 |
| 4,731,858 | 3/1988 | Grasmueller et al. | 382/21 |
| 4,773,098 | 9/1988 | Scott | 382/21 |

OTHER PUBLICATIONS

Yuzo Kato et al., "Automatic Production Method of a Dictionary for the Pattern Recognition", *The Institute of Electronics and Communication Engineers of Japan*, pp. 1-12.

Kazuhiko Yamamoto et al., "Recognition of Hand-printed Characters by an Outermost Point Method", *Pattern Recognition*, vol. 12, 1980, pp. 229-236.

Henry S. Baird, "Feature Identification for Hybrid Structural/Statistical Pattern Classification", *Computer Vision, Graphics, and Image Processing*, 42, 1988, pp. 318-333.

Hirobumi Nishida et al., "A Structural Description of Curves by Quasi-Topological Features and Singular Points", *IAPR Workshop on Syntactic & Structural Pattern Recognition, Jun. 1990, pp. 310-334*.

*Primary Examiner*—Jose L. Couso
*Attorney, Agent, or Firm*—Mason, Fenwick & Lawrence

[57] ABSTRACT

A method for classifying character line patterns in a dictionary, includes the steps of: (a) obtaining a first class to which one or a plurality of first line patterns belong; (b) obtaining a second class to which one or a plurality of second line patterns belong, each of the first and second line patterns being characterized by structural information, (c) determining whether or not the structural information of the first line pattern and the structural information of the second line pattern are similar to each other in accordance with a predetermined rule; and (d) combining the first and second classes with each other when the step (c) determines that the structural information of the first line pattern and the structural information of the second line pattern are similar to each other, so that a new class is obtained, to which the first and second line patterns belong.

5 Claims, 19 Drawing Sheets

[/, head, \, tail]

[I, head, \, tail]

[/, head, I, head]

[/, head, /, head]

[\, head, /, head]

[−, head, /, head]

[\, head, −, head]

[\, head, \, head]

[/, tail, \, head]

[l, tail, \, head]

[/, tail, l, tail]

[/, tail, /, tail]

[\,tail,/,tail]

[-,tail,/,tail]

[\,tail,-,tail]

[\,tail,\,tail]

<3,3>            <3,0>

(a)            (b)

(c)            (d)

<2,0>            <2,1>

<3,0>

(a)

<3,1>

(b)

(c) (d)

<2,0>

<2,1>

<3,0>           <3,1>

(a)           (b)

(c)

<2,1>

⟨3,0⟩

(a)

(b)　　　　　(c)

⟨2,0⟩　　　　　⟨2,1⟩

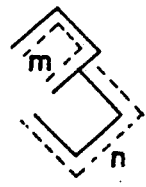 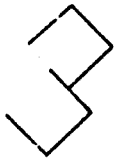 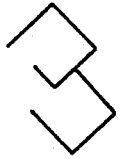 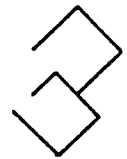
FIG. 16(a)   FIG. 16(b)   FIG. 16(c)   FIG. 16(d)
 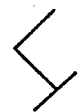  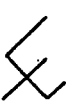 
FIG. 17(a)   FIG. 17(b)   FIG. 17(c)   FIG. 17(d)   FIG. 17(e)
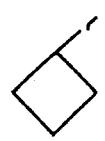 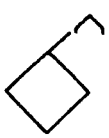 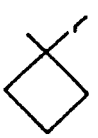 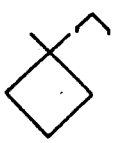 
FIG. 18(a)   FIG. 18(b)   FIG. 18(c)   FIG. 18(d)   FIG. 18(e)

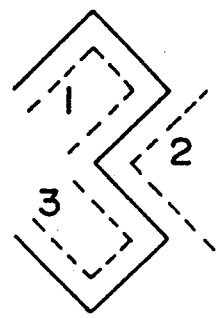
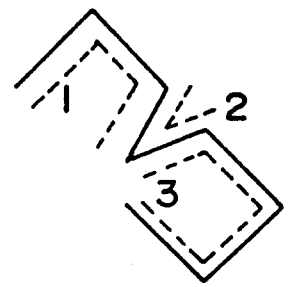
FIG. 22(a)　　　　　FIG. 22(b)
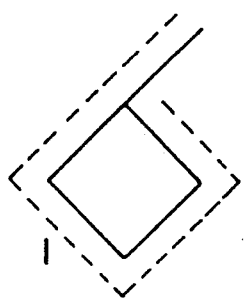
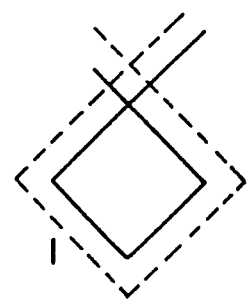
FIG. 23(a)　　　　　FIG. 23(b)
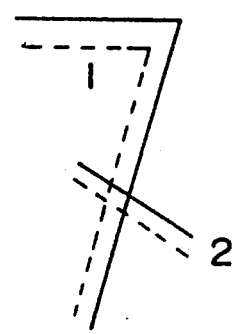
FIG. 24(a)　　　　　FIG. 24(b)

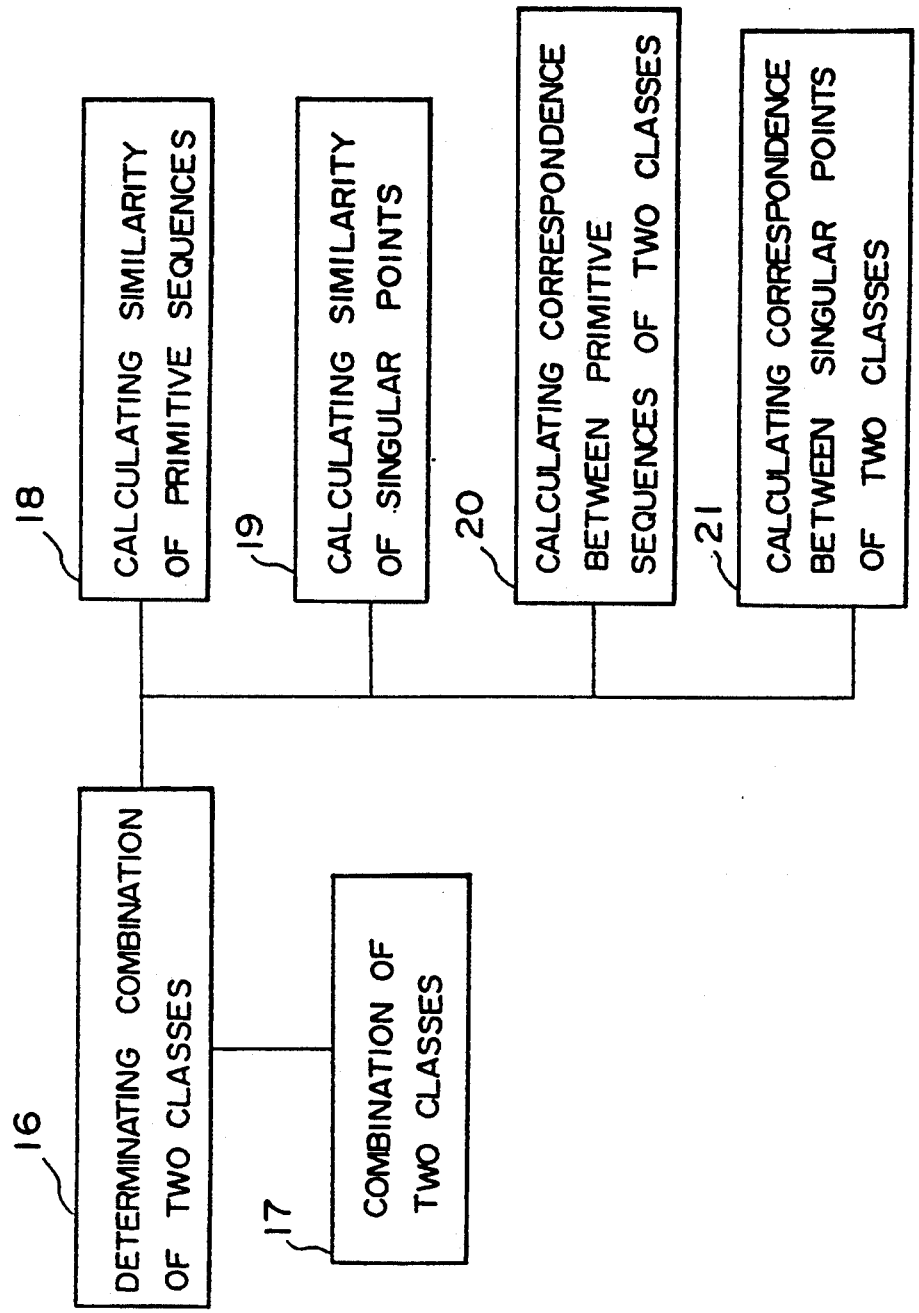

METHOD FOR CLASSIFYING LINE PATTERNS OF CHARACTERS IN DICTIONARY

BACKGROUND OF THE INVENTION (1) Field of the Invention

The present invention generally relates to a method for classifying characters in a dictionary, and more particularly to a method for classifying characters each of which is described by structural features in dictionary.

(2) Description of Related Art

There are two types of character recognition methods. In the first type a class, to which a character belongs, is determined based on a distance between a measurement vector which is a feature vector of the input character and a pattern class vector which is a feature vector of a standard pattern in a dictionary. In the second type, the character is recognized based on structural features of the character. The second type of character recognition method may be in accordance with a human intuition. The first type of character recognition method has advantages in that a dictionary can be made automatically based on statistical decision theory and a neural network theory. However, the first type has disadvantages in that a dimension of the feature vector is generally large and the dictionary is made in a way not always in accordance with human intuition, so that it is difficult to analyze recognition errors and reasons for a rejection. The second type of character recognition method uses structural feature information regarding character shape, in which use it is in accordance with the human intuition. This method has advantages in that the character can be recognized in a manner similar to that of human beings and it is easy to analyze both recognition errors and reasons for a rejection. However in the second type it is difficult to automatically make the dictionary.

Conventionally, to eliminate the disadvantages of the second type of character recognition method, a method for automatically making a structural dictionary has been proposed, for example, in Yuzo Kato, "Method for automatically making dictionary in stroke structural solution" (Technical report of The Institute of Electronics and Communication Engineers of Japan). In this conventional method, a chain code is used as a unit for describing a feature, hence it is difficult to recognize a character which is somewhat different than a standard in local parts thereof, and a made dictionary is complex. In addition, as a degree of similarity between characters and features of character is calculated through heuristic functions, a result of the calculation includes both structural and measuring information. Thus, when the dictionary is remade with additional training data, the dictionary must be remade from the beginning. Further, as people can draw strokes of a character in various writing orders, it is difficult to describe features of one character by a class in the dictionary.

SUMMARY OF THE INVENTION

Accordingly, a general object of the present invention is to provide a novel and useful method for classifying characters in a dictionary in which the disadvantages of the aforementioned prior art are eliminated.

A more specific object of the present invention is to provide a method for classifying characters in a dictionary in which classification groups of the characters are as few as possible, and the classification is performed in accordance with human intuition.

Another object of the present invention is to provide a method, for classifying characters in a dictionary, in which the dictionary, used to recognize characters based on their structural features can be automatically made.

The above objects are achieved by a method for classifying character line patterns in a dictionary, the method comprising the steps of: (a) obtaining a first class to which one or a plurality of first line patterns belongs; (b) obtaining a second class to which one or a plurality of second line patterns belongs, each of the first and second line patterns being characterized by structural information, (c) determining whether or not the structural information of the first line pattern and the structural information of the second line pattern are similar to each other in accordance with a predetermined rule; and (d) combining the first and second classes with each other when the step (c) determines that the structural information of the first line pattern and the structural information of the second line pattern are similar to each other, so that a new class to which the fist and second line patterns belong is obtained.

According to the present invention, as two classes are combined with each other, so that a new class is obtained, based on the structural information by which the line patterns are featured, a dictionary in accordance with a human intuition can be easily made.

Additional objects, features and advantages of the present invention will become apparent from the following detailed description when read in conjunction with the accompanying drawings.

BRIEF DESCRIPTION OF THE DRAWINGS

FIGS. 16(a)-16(d), 17(a)-17(e) and 18(a)-18(e), (hereinafter referred to as FIGS. 16, 17, and 18, respectively) are diagrams illustrating examples of S(j) satisfying an S-condition.

FIGS. 22(a)-22(b), 23(a)-23(b) and 24(a)-24(b)-(hereinafter referred to as FIGS. 22, 23 and 24, respectively) are diagrams illustrating examples of line patterns belonging to classes I and J.

FIG. 25 is a block diagram illustrating an essential part of a dictionary forming block shown in FIG. 2.

DESCRIPTION OF PREFERRED EMBODIMENTS

A description will now be given of an embodiment of the present invention.

Figure 1:
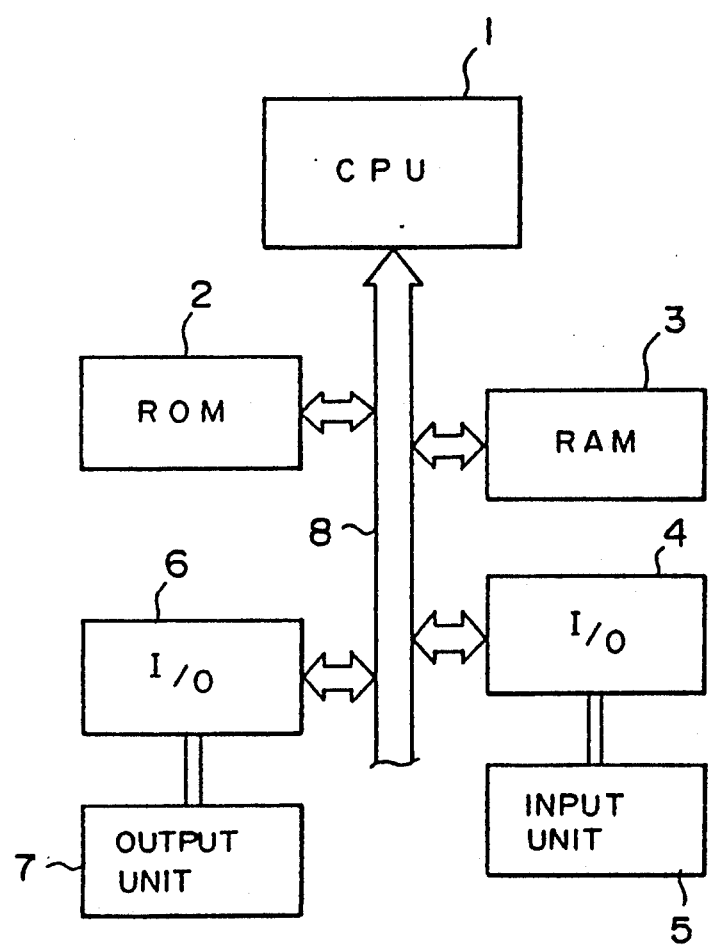
FIG. 1 is a block diagram illustrating a character recognition system.

Referring to FIG. 1, which shows a basic configuration of a character recognition system, the character recognition system has a CPU 1 (Central Processing Unit), a ROM 2 (Read Only Memory), a RAM 3 (Random Access Memory), an interface 4 to which an input unit 5 including an optical scanner (OCR), a key board and so on are coupled, and an interface 6 to which an output unit 7 including a display unit, a printer and so on are coupled. The CPU 1, the ROM 2, the RAM 3 and the interfaces 4 and 6 are connected to each other by system bus 8. The CPU 1 processes data in accordance with programs which are stored in the ROM 2. Data generated by the processing of the CPU 1 is stored in the RAM 3. An area used for a character recognition process is formed in the RAM 3. Image data input from the input unit 5 is supplied via the interface 4 and the system bus 8 to the CPU 1. The CPU 1 carries out a recognition process in accordance with a predetermined procedure. The recognition results are supplied from the CPU 1 via the system bus 8 and the interface 6 to the output unit 7, so that the recognition results are, for example, displayed on the display unit, and printed, by the printer, on a recording sheet.

Figure 2:
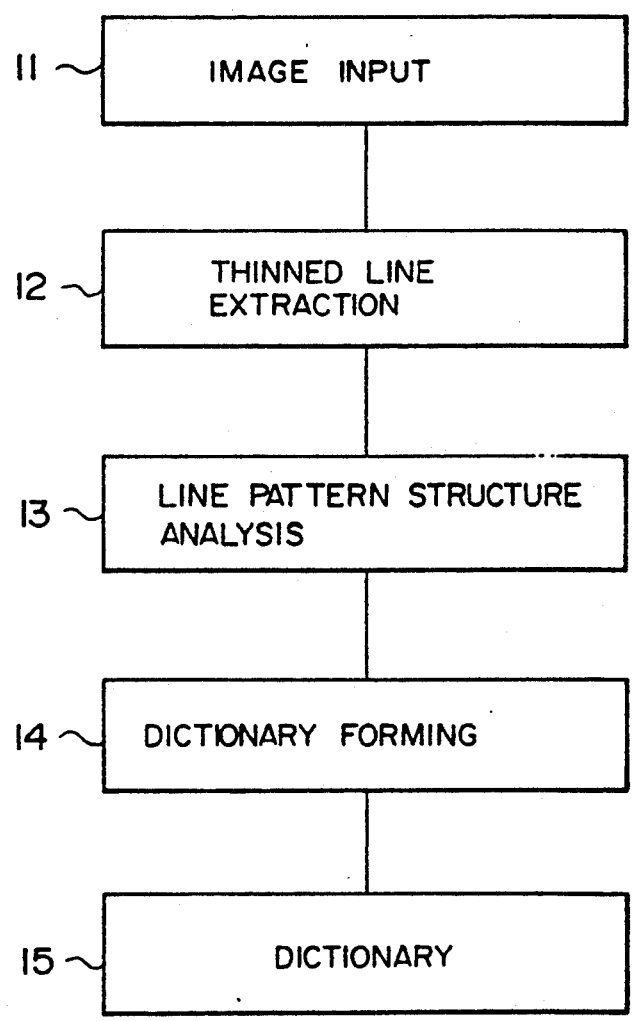
FIG. 2 is a block diagram illustrating fundamental functions for making a dictionary which are provided in the character recognition system shown in FIG. 1.
Figure 3A:
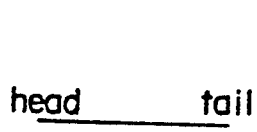
FIGS. 3(a)-3(d)(hereinafter referred to as FIG. 3) are diagrams illustrating xy-monotone curves (primitives).
Figure 3B:
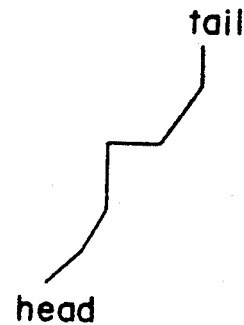
Figure 3C:
Figure 3D:
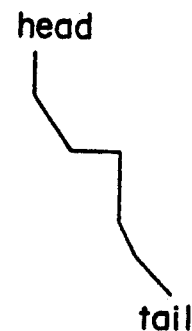

FIG. 2 shows fundamental functions for making a dictionary. Referring to FIG. 2, an image input block 11 is included in the input unit 5 shown in FIG. 1. A thinned line extraction block 12, a line pattern structure analysis block 13 and a dictionary forming block 14 are respectively included in the CPU 1 shown in FIG. 1. A pattern dictionary 15 is included in the ROM 2 or RAM 3 shown in FIG. 1.

When a dictionary is made, the image input block 11 successively reads a plurality of line patterns (input line patters) corresponding to one character. The thinned line extraction block 12 extracts a thinned line from each of the input line patterns corresponding to the character in accordance with a process described, for example, in a U.S. pending application Ser. No. 422,502. The line pattern structure analysis block 13 analyzes a thinned line extracted by the thinned line extraction block 13, so that a general structure of curves forming a line pattern is obtained. The dictionary forming block 14 calculates a degree of similarity between the structure of the input line pattern obtained by the line pattern structure analysis block 13 and the structure of a standard line pattern which is classified in the pattern dictionary 15. When a structure of a classified standard line pattern in the dictionary is similar to that of the input line pattern, the input line pattern is classified into the same class as the classified standard pattern. When there is no structure similar to that of the input line pattern in the dictionary, a new class is generated in which the new input line pattern is classified as a standard line pattern.

The dictionary forming block 14 is formed as shown in FIG. 25. That is, two classes to which line patterns of characters belong are combined with each other based on a similarity of primitive sequences and a similarity of singular points.

A detailed description will now be given of processes in the line pattern structure analysis block 13 and the dictionary forming block 14.

(1) THE ANALYSIS OF LINE PATTERN

The structure of input line pattern is described by feature data. In the line pattern structure analysis block 13, feature data is extracted from the input pattern in accordance with a process described in U.S pending patent application Ser. No. 584,800. That is, the feature data is extracted as follows.

Each of the stroke components forming an input line pattern (stroke graph) corresponding to a character is formed of primitive sequences. Each of the primitive sequences is formed by a concatenation of primitives each of which is a monotone curve. Features of the input line pattern are described as the structure made by a combination of primitive sequences, a coupling relationship between the primitive sequences, and a binomial relationship between the primitive sequences such as a coupling relationship between the primitive sequences at a singular point (a diverging point or an intersecting point).

(i) Primitives of Curve

An xy-monotone curve is defined as a curve whose x component and y component values are either non-increasing or non-decreasing when the curve is traced. When coordinates at two end points of an xy-monotone curve are respectively P $(x_o,y_o)$ and $Q(x_1,y_1)$ where $x_o<x_1$, $y_o<y_1$ if $x_o=x_1$, the end point P is referred to as a head and the end point Q is referred to as a tail. In addition, an xy-monotone curve in which $y_o=y_1$ is referred to as a y constant curve. An xy-monotone curve in which $(x_o-x_1)\times(y_o-y_1)>0$ is referred to as an xy-changing curve. An xy-monotone curve in which $x_o=x_1$ is referred to as an x constant curve. An xy-monotone curve in which $(x_o-x_1)\times(y_o-y_1)<0$ is referred to as an xy-reverse changing curve. FIG. 3 shows examples of xy-monotone curves. The y constant curve which is a horizontal line segment is shown in FIG. 3 (a) and hereinafter denoted by "—". The xy-changing curve which raises on the right and falls on the left is shown in FIG. 3 (b) and hereinafter denoted by "/". The x constant curve which is a vertical line segment is shown in FIG. 3 (c) and hereinafter denoted by "|". The xy-reverse changing curve which raises on the left and falls on the right is shown in FIG. 3 (d) and is hereinafter denoted by "\".

(ii) Concatenation of Primitives

Concatenation rules for two primitives are introduced so that a higher-order primitive may be defined by the concatenation of the above four types of primitives.

It is assumed that two xy-monotone curves form a curve which is not an xy-monotone curve and the xy-monotone curves are not included in each other. These two xy-monotone curves are respectively defined as primitives a and b. P is a point in the intersection of the primitives a and b, and R and Q are points sufficiently close to P. Q is included in only the primitive a and R is included in only the primitive b. In this case, it is assumed that a vector product of a vector $(x_q-x_p, y_q-y_p)$ and a vector $(x_r-x_p, y_r-y_p)$ is greater than zero, $(x_q-x_p)\times(y_r-y_p)-(x_r-x_p)\times(y_q-y_p)>0$ where coordinate data of the point P is $coor(P)=(x_p,y_p)$, coordinate data of the point Q is $coor(Q)=(x_q,y_q)$, and coordinate data of the point R is $coor(R)=(x_r,y_r)$.

In the assumption described above, when the concatenation of two primitives a and b.are indicated by $a \xrightarrow{j} b \quad j = 0, 1, 2, 3,$ the concatenations of the primitives a and b are defined as follows.

In a case where A and B are one of the types "/", "\", "|" and "—" and α and β are either the "head" or the "tail", a symbol [A, α, B, β] indicates that the primitives a of type A and the primitive b of type B are concatenated with each other at α of the primitive a and β of the primitive b.

(Rule 1)

The concatenations represented by [ /, head, \, tail], [|, head, \, tail], [ /, head, |, head], and [ /, head, /, head] are respectively defined as being of downward convexity.

$a \xrightarrow{0} b$ (downward convexity)

(Rule 2)

The concatenations represented by [\, head /, head], [\, head, —, head], [—, head /, head], and [\, head, \, head] are respectively defined as being of leftward convexity.

$a \xrightarrow{1} b$ (leftward convexity)

(Rule 3)

The concatenations represented by [ /, tail, \, head], [/, tail, |, tail], [|, tail, \, head], and [ /, tail, /, tail] are respectively defined as being of upward convexity.

$a \xrightarrow{2} b$ (upward convexity)

(Rule 4)

The concatenations represented by [ \, tail, /, tail], [\, tail, —, tail][—, tail, /, tail], and [\, tail, \, tail] are respectively defined as being of right convexity.

$a \xrightarrow{3} b$ (right convexity)

Figure 4:
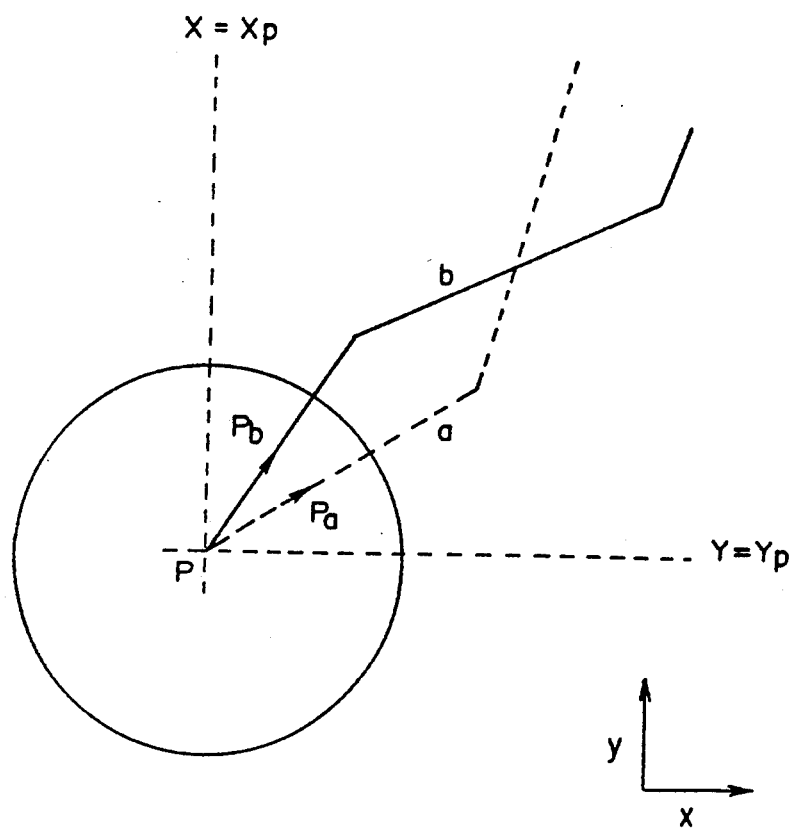
FIG. 4 is a diagram illustrating a concatenation of primitives.
Figure 5A:
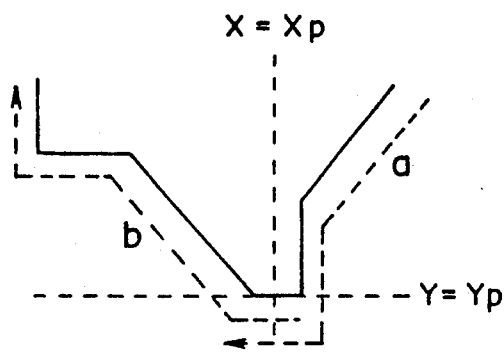
FIGS. 5(a)-5(d), 6(a)-6(d), 7(a)-7(d), and 8(a)-8(d) (hereinafter referred to as FIGS. 5, 6, 7, and 8, respectively) are diagrams illustrating concatenation rules for primitives.
Figure 5B:
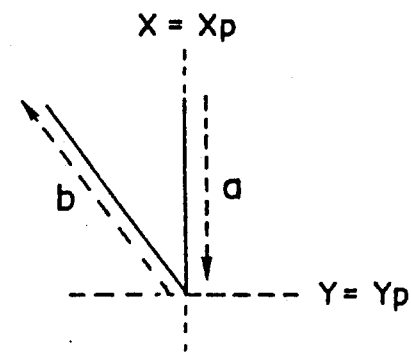
Figure 5C:
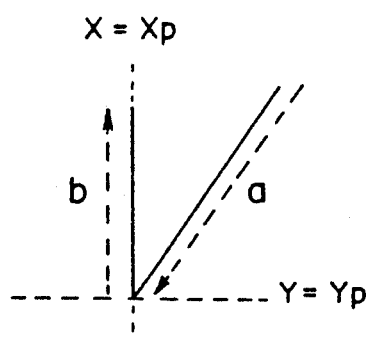
Figure 5D:
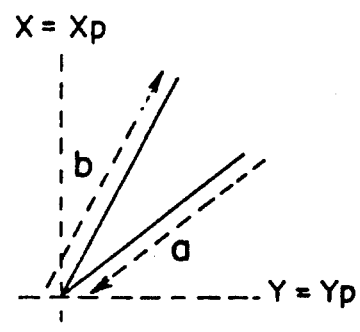
Figure 6A:
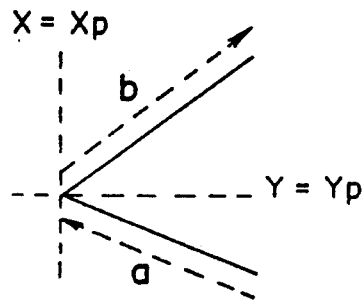
Figure 6B:
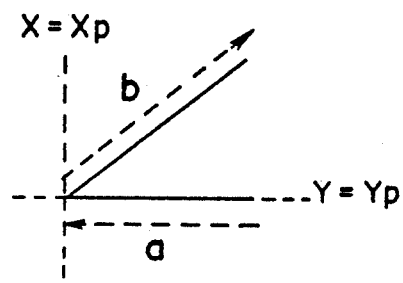
Figure 6C:
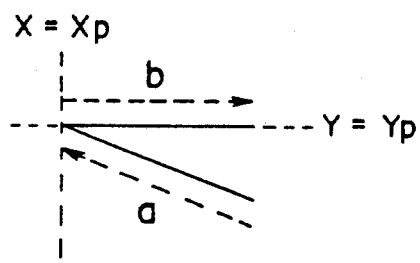
Figure 6D:
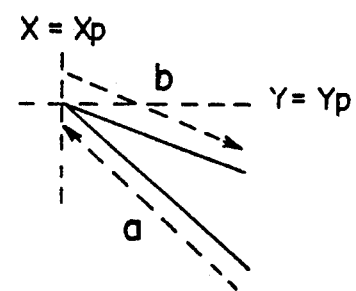
Figure 7A:
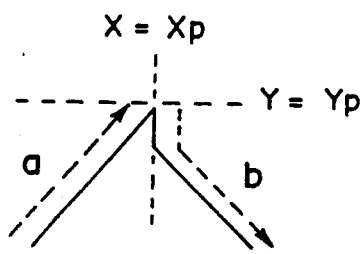
Figure 7B:
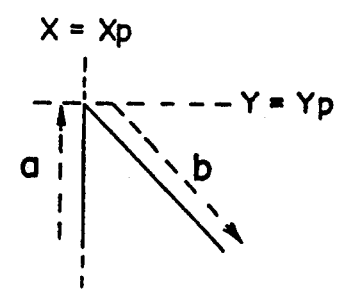
Figure 7C:
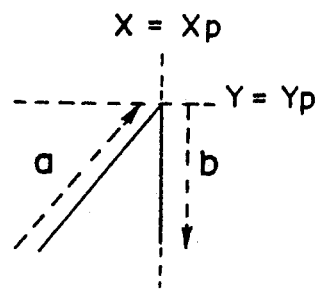
Figure 7D:
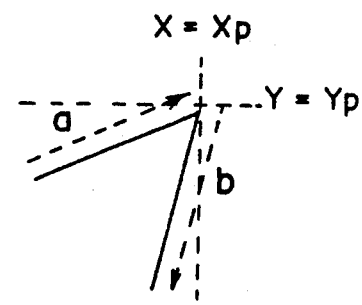
Figure 8A:
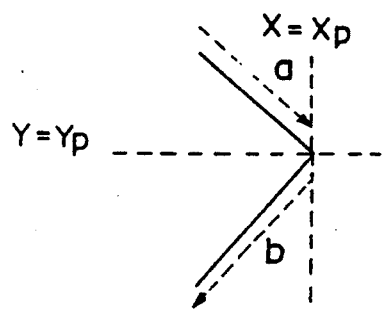
Figure 8B:
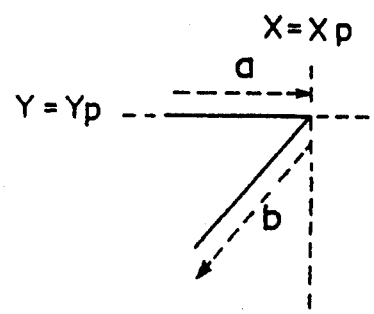
Figure 8C:
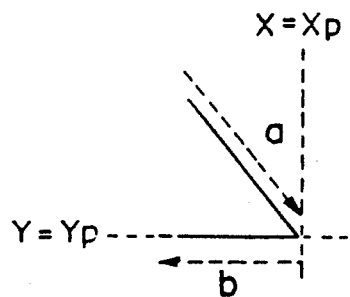
Figure 8D:
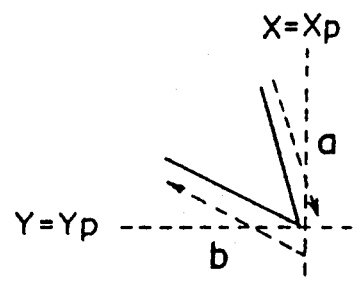

FIG. 4 shows the concatenation of two primitives. Referring to FIG. 4, two primitives a and b are concatenated so that a pair of vectors $(\overrightarrow{PP_a}, \overrightarrow{PP_b})$ is in a right-handed system, where P is a point in an intersection of the primitives a and b, $P_a$ and $P_b$ are respectively points on the primitives a and b. $P_a$ corresponds to Q described above and $P_b$ corresponds to R described above. In this case, the concatenation of primitives a and b is denoted by the above symbol $a \xrightarrow{j} b$.

FIG. 5 (a), (b), (c) and (d) show the primitives a and b which are concatenated in accordance with the Rule 1 ($a \xrightarrow{0} b$). FIG. 6 (a), (b), (c) and (d) show the primitives a and b which are concatenated in accordance with the Rule 2 ($a \xrightarrow{1} b$). FIG. 7 (a), (b), (c) and (d) show the primitives a and b which are concatenated in accordance with the Rule 3 ($a \xrightarrow{2} b$). FIG. 8 (a), (b), (c) and (d) show the 6 primitives a and b which are concatenated in accordance with the Rule 4 ($a \xrightarrow{3} b$).

(iii) Primitive Sequence of the Curves

Figure 9:
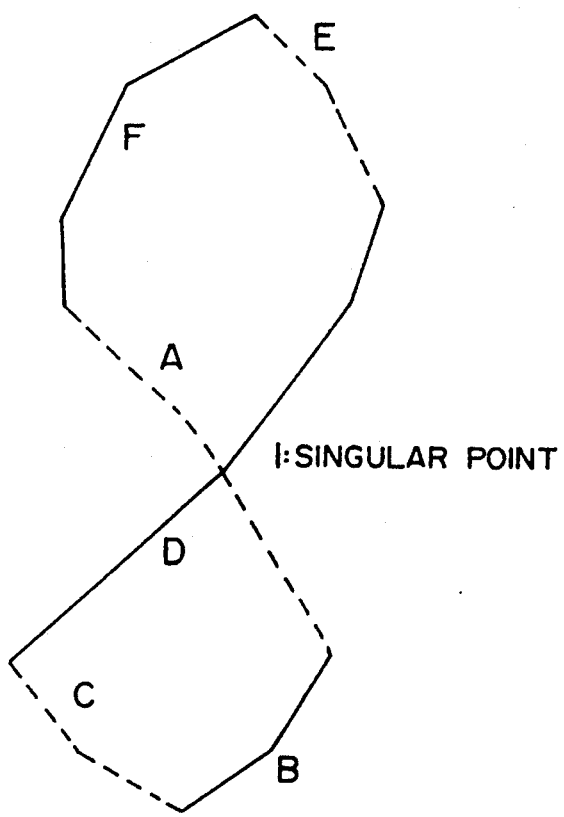
FIG. 9 is a diagram illustrating a line pattern formed of a plurality of primitives.

When the xy-monotone curves (primitives) which form a curve and which are not included in each other are extracted, primitive sequences formed of the xy-monotone curves (the primitives) can be obtained by using the above concatenation rules. That is, when the concatenation of $a \xrightarrow{j} b$ is regarded as a directed network and a transitive law is applied to n+1 primitives, the following sequence can be generated.

$$a_0 \xrightarrow{j_1} a_1 \xrightarrow{j_2} \ldots a_{n-1} \xrightarrow{j_n} a_n \quad (0)$$

where there exists either b nor c such that $b \xrightarrow{j_0} a_0 \quad j_0 = 0, 1, 2, 3$ $a_n \xrightarrow{j_{n+1}} c \quad j_{n+1} = 0, 1, 2, 3$ For example, the structure of a line pattern (a curve) corresponding to numeral "8" shown in FIG. 9 will be analyzed. In this case, the following two primitive sequences 1 and 2 are obtained.

$1: A \xrightarrow{3} B \xrightarrow{0} C \xrightarrow{1} D$ $2: A \xrightarrow{1} F \xrightarrow{2} E \xrightarrow{3} D$ A singular point, defined for example, as a point at which two or more line segments are connected exists on the primitives A and D. The structure Q of a curve (a line pattern) formed of M strokes, $N_p$ primitive sequences and $N_s$ singular points can be described by the following formula (1).

$$Q=(M, N_p, N_s, C, \pi, st, \tau) \quad (1)$$

In the case shown in FIG. 9, the parameters included in the above formula (1) are as follows.

$M=1, N_p=2, N_s=1$

C, which denotes a coupling between primitive (sequences is, as follows.

$C=[1-2, 1-2]$

The primitive sequences 1 (A - B - C - D) and 2 (A - F - E - D) shown in FIG. 9 have a common primitive A which is positioned at an end of each of primitive sequences 1 and 2. In general, there are two types of connection between two primitive sequences. In the first type of connection, the primitive sequences are connected to each other in a state where the common primitive is positioned at a leading end of each of the primitive sequences. In the second type of connection, the primitive sequences are connected to each other in a state where the common primitive is positioned at a tail end of each of primitives.

$1 \overset{h}{-} 2$

The above formula indicates that the primitives 1 and 2 are connected in a state of the first type of connection.

$1 \overset{t}{-} 2$

The above formula indicates that the primitives 1 and 2 are connected in a state of the second type of connection.

π is a function denoting a label, for each of the primitive sequences, which will be described later. In the case shown in FIG. 9, the label $\pi(1)$ of the primitive sequence 1 is $$\pi(1) = <4,3>,$$

and the label $\pi(2)$ of the primitives 2 is $$\pi(2) = <4,1>.$$

The parameter st is a function denoting a characteristic of a stroke to which each of the primitive sequences belongs. In the case shown in FIG. 9, the parameters st(1) and st(2) are equal to one.

$$st(1) = st(2) = 1$$

The parameter $\tau$ is a function denoting a structure of the singular point. The structure of the singular point can belong, for example, to one of three types. The first type is referred to as an X-type in which line segments are connected at the singular point in an X-shape, the second type is referred to as a T-type in which the line segments are connected at the singular point in a T-shape and the third type is referred to as an K-type in which the line segments are connected at the singular point in a K-shape. In the case shown in FIG. 9, as a singular point 1 exists on the primitives 1 and 2, the parameter $\tau(1)$ includes four structures indicated by the following equation.

$$\alpha(1) =$$

$$[(1, h) \overset{x}{-} (1, h), (1, h) \overset{x}{-} (2, h), (2, h) \overset{x}{-} (2, t), (2, h) \overset{x}{-} (1, t)]$$

(2) Quasi-Topological Features and Classification of Character Line Patters by Singular Points In this chapter, a description will be given of a method for expressing sequential transformations of curves and singular points in a computer.

(i) Sequential Transformation of Primitive Sequences

In a case where line patterns have primitive sequences as features, obtained by a sequential transformation processing, the line patterns can belong to one class.

FIGS. 10 through 13 show sequential transformations of a primitive sequence forming a curve. Parameters ps and id of a label $<ps,id>$ with respect to a primitive sequence $$a_0 \xrightarrow{j_1} a_1 \xrightarrow{j_2} \ldots \xrightarrow{j_{n-1}} a_{n-1} \xrightarrow{j_n} a_n \quad (2)$$

are respectively defined as follows:

$$ps = n + 1 + L + M \quad (3)$$

$$id = j_1 \quad (4)$$

where L is a number of concatenations of primitives $a_i$ and $a_{i+1}$ which are of the same, $$a_i \xrightarrow{j_{n+1}} a_{i+1} \quad i = 0, 1, \ldots, \text{and } n - 1$$

and M is a number of primitives $a_i$ (i=1, 2, ..., and n−1) which are either of the type "|" or "—".

The parameter ps corresponds to a degree of rotation of the primitive sequence, and the parameter id corresponds to an initial direction in which the primitive sequence is extended. In cases shown in FIGS. 10 through 13, L and M are equal to zero (L=M=0) and a primitive sequence is simple so that a primitive $a_0$ which is positioned at a leading end of the primitive and a primitive an which is positioned at a tail end of the primitive sequence are either the type "/" or "\". That is, in the primitive sequences shown in FIGS. 10 through 13, primitives of "\" and "/" are alternately concatenated.

A description will now be given of a simple expression of a sequential transformation between a first primitive sequence having a label $<n,*>$ and a second primitive sequence having a label $<n+1,*>$.

A primitive sequence having a label $<n,id>$ is denoted as follows.

$$a_0 \xrightarrow{id} a_1 \xrightarrow{id+1} \ldots \xrightarrow{id+n-2} a_{n-1} \quad (5)$$

The primitive sequence (5) can be transformed by the following operations to a primitive having a label $<n+1,*>$. First, a new primitive $a_{-1}$ is added to the head primitive $a_0$ positioned at the leading end of the primitive sequence (5), so that the following primitive sequence having the label $<n+1,*>$ is obtained.

$$a_{-1} \xrightarrow{id-1} a_0 \xrightarrow{id} a_1 \xrightarrow{id+1} \ldots \xrightarrow{id+n-2} a_{n-1} \quad (6)$$

Second, a new primitive $a_n$ is added to the tail primitive $a_{n-1}$ positioned at the tail end of the primitive sequence (5), so that the following primitive sequence having the label $<n+1,*>$ is obtained.

$$a_0 \xrightarrow{id} a_1 \xrightarrow{id+1} \ldots \xrightarrow{id+n-2} a_{n-1} \xrightarrow{id+n-1} a_n \quad (6a)$$

That is, the primitive sequence having a label $<ps,id>$ can be transformed into a primitive sequence having either a label $<ps+1,id-1>$ or a label $<ps+1,id>$ by either an operation of adding a new primitive to either a leading end of the original primitive sequence or a tail end of the original primitive sequence.

The primitive sequence (5) can be $<n-1,*>$ by the following operations. First, the head primitive $a_0$ is removed from the primitive sequence (5), so that the following primitive sequence having a label $<n-1,*>$ is obtained.

$$a_1 \xrightarrow{id+1} a_2 \xrightarrow{id+2} \ldots \xrightarrow{id+n-2} a_{n-1}$$

Second, the tail primitive $a_{n-1}$ is removed from the primitive sequence (5), so that the following primitive sequence having a label $<n-1,*>$ is obtained.

$$a_0 \xrightarrow{id} a_1 \xrightarrow{id+1} \ldots \xrightarrow{id+n-3} a_{n-2}$$

That is, the primitive sequence having a label $<ps,id>$ can be transformed into a primitive sequence having either a label $<ps-1,id+1>$ or a label $<ps-1,id>$ by either an operation of removing the head primitive from the original primitive sequence or an operation of removing the tail primitive from the original primitive sequence.

Figure 10:
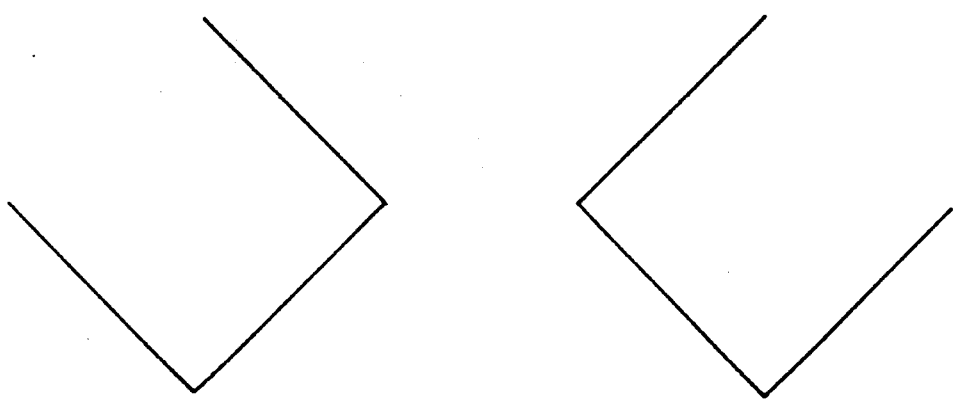
FIGS. 10, 11, 12, and 13 are diagrams illustrating sequential transformation of a primitive sequence.
Figure 10:
Figure 10:
Figure 10:
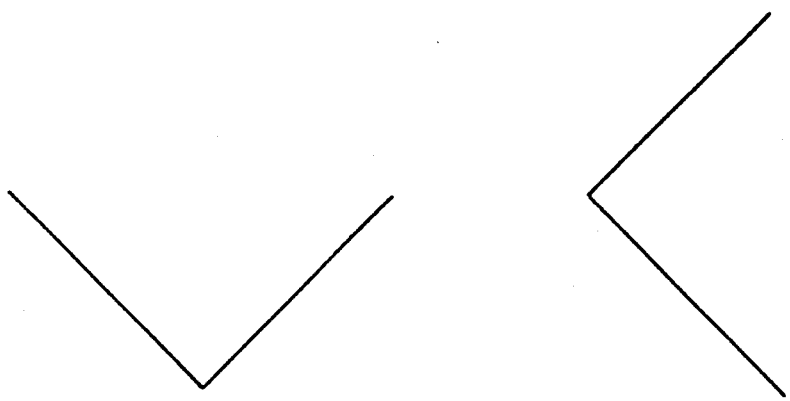
Figure 11:
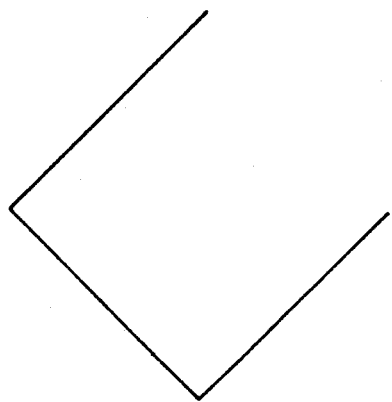
Figure 11:
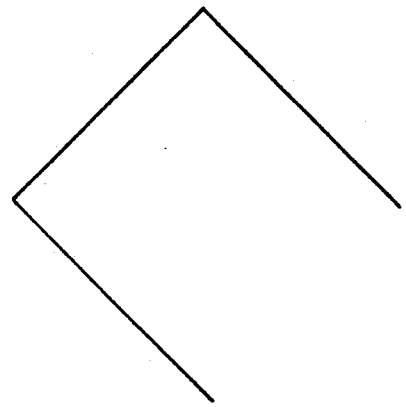
Figure 11:
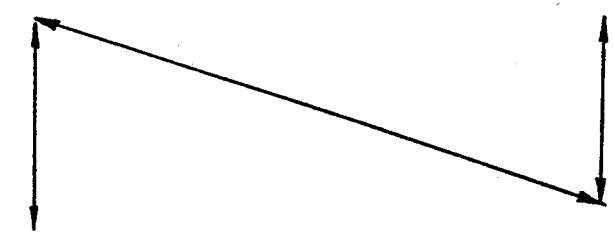
Figure 11:
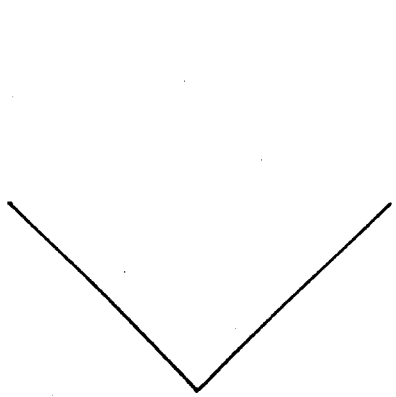
Figure 11:
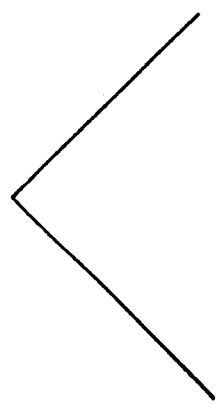
Figure 12:
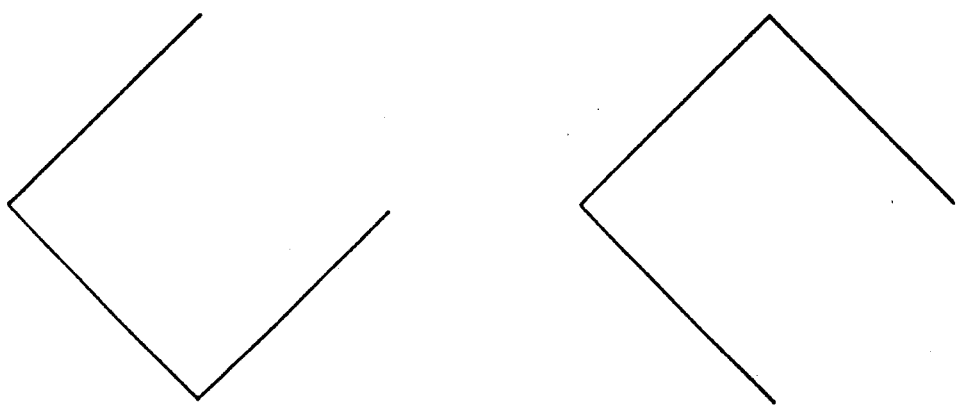
Figure 12:
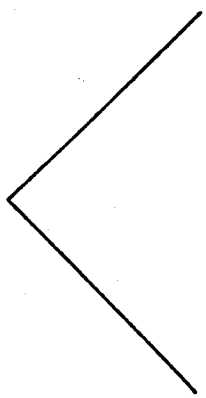
Figure 13:
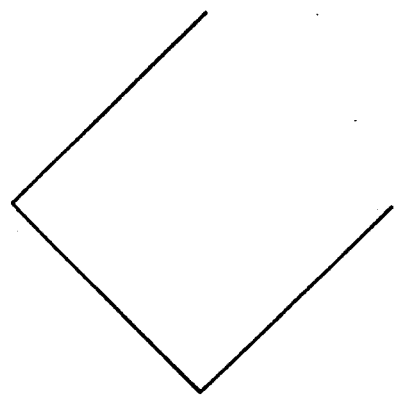
Figure 13:
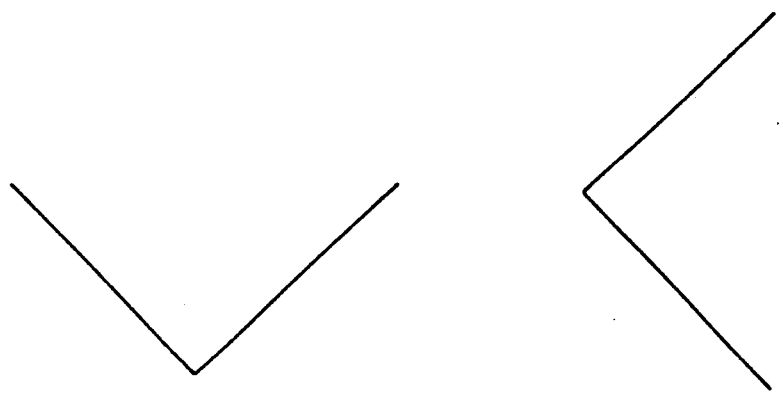

For example, in FIG. 10, primitives having labels <3,3>, <3,0>, <2,0> and <2,1> shown in (a), (b), (c) and (d) can be sequentially transformed into each other by the operations described above, as shown by arrows. Primitive sequences shown in FIGS. 11 through 13 can also be transformed to each other by the above operations. In the cases shown in FIGS. 10 through 13, primitive sequences having labels <$ps,id_o$> and <$ps+1,id_1$> can be mutually transformed into each other only in the case where either $id_o = id_1$ or $id_o = id_1 + 1$ is satisfied.

That is, line patterns having the primitives shown in each of FIGS. 10 through 13 can be classified in the same class in a dictionary.

(ii) Sequential Transformation of Structure of Singular point

The structure of a singular point generated by a coupling of two primitive sequences i and j is expressed by the following formula $$[i, p_i] \overset{\chi}{-} [j, p_j]$$

where pi is a position of the singular point on the primitive sequence i, and $p_j$ is a position of the singular point on the primitive sequence j. $\chi$ denotes a type of connection of primitives i and j at the singular point and is one of three types of connection, the X-type, the T-type and the K-type. The X-type singular point can be made by the operation of making a primitive sequence project from another primitive sequence at the T-type singular point.

In a case where the parameter ps of a label <ps,*> of the primitive sequence i is equal to or greater than 2 (ps≦2), the position $p_i$ of the singular point can move on the primitive sequence i in the following order, hp - h - o - t - tp where hp denotes an end point of the head primitive in the primitive sequence, h denotes the head primitive, t denotes the tail primitive in the primitive sequence, o denotes a primitive positioned between the head primitive and the tail primitive, and tp is an end point of the tail primitive in the primitive sequence. In a case where the primitive sequence is formed of only one primitive, the position $p_i$ of the singular point can move on the primitive sequence i in the following order.

hp - 0 - tp

To accomplish simple expression of a sequential transformation of the structure of a singular point, a predetermined integer is allotted to each of elements [hp, h, o, t, tp]. A function for allotting an integer to each of the elements [hp, h, o, t, tp] in the primitive sequence i is defined as pcode$^{(i)}$. In a case where the primitive sequence i is expressed by the formula (5) and is made of two or more primitives, the function pcode$^{(i)}$ describes the following relationship between the elements [hp, h, o, t, tp] and corresponding integers.

$$pcode^{(i)}: \begin{bmatrix} hp & - & -2 \\ h & - & -1 \\ o & - & 0 \\ t & - & 1 \\ tp & - & 2 \end{bmatrix}$$

In a case where the primitive sequence is made of only one primitive, the function pcode$^{(i)}$ describes the following relationship between the elements [hp, o, tp] and the corresponding integers.

$$pcode^{(i)}: \begin{bmatrix} hp & - & -1 \\ o & - & 0 \\ tp & - & 1 \end{bmatrix}$$

A function pcode$^{(j)}$ is defined with respect to the primitive sequence j, in the same manner as the function pcode$^{(i)}$. In this case, the structure of the singular point denoted by $$[i, p_i] \overset{\chi}{-} [j, p_j]$$

corresponds to a point on a two dimensional lattice defined by the following coordinate data.

$(pcode^{(i)}(p_i), pcode^{(j)}(p_j))$ $\epsilon[(x, y) | x, y: \text{integer}, -2 \leq x, y \leq 2]$ The structure of the singular point denoted by $(x_o, y_o)$ can be sequentially transformed to the structure of the singular point denoted by either $(x_o, y_o \pm 1)$ or $(x_o \pm 1, y_o)$. Line patterns having the structures of the singular points obtained by the sequential transformation can be classified in the same class in the dictionary.

Figure 14A:
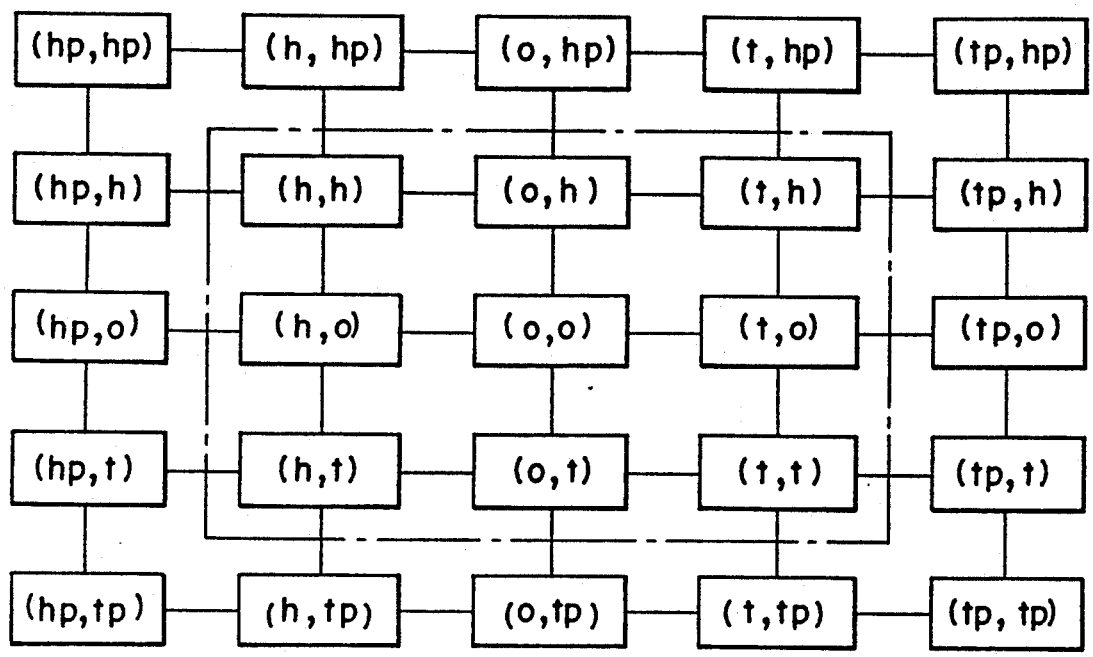
FIGS. 14A and 14B are diagrams illustrating sequential transformation of a singular point.
Figure 14B:
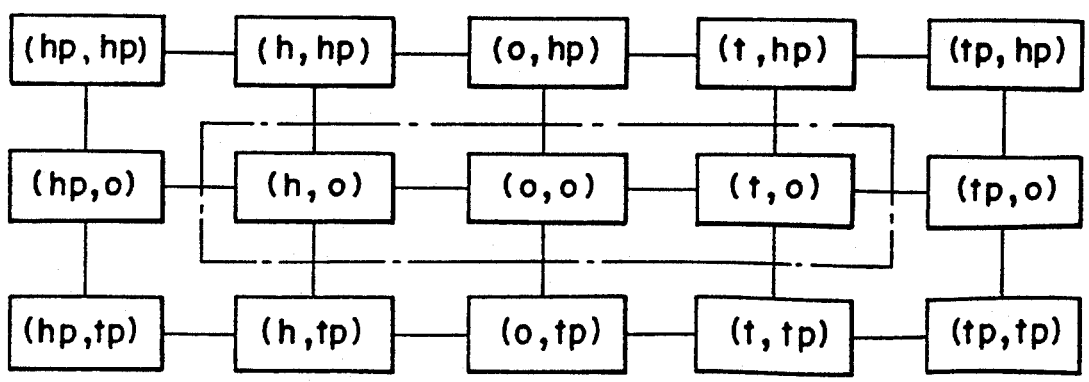

In a case where both the primitive sequences i and j are made of two or more primitives, the sequential transformation of the structure of the singular point which exists on the primitive sequences i and j is shown in FIG. 14A. In FIG. 14A, each point on the two dimensional lattice corresponds to one of the structures of a singular point. The coordinates, denoted by hp, h, o, t and tp, of each point correspond respectively to positions of the singular point on the primitive sequences i and j. In a case where the primitive sequence i is made of two or more primitives and the primitive sequence j is made of only one primitive, the sequential transformation of the structure of the singular point is shown in FIG. 14B. In the above cases, a set of points defined by the following formula denotes the X-type connection or the K-type connection.

$[(x, y) | x, y: \text{integer},$ $pcode^{(i)}(hp) < x < pcode^{(i)}(tp),$ $pcode^{(j)}(hp) < y < pcode^{(j)}(tp)]$ The set of the points defined by the above formula corresponds to areas shown by a chain line in FIGS. 14A and 14B. Each point outside of the areas shown in FIGS. 14A and 14B denotes a T-type connection.

(iii) Classification of Line Pattern

Line patterns whose shapes are similar to each other are classified in the same class. The structure of each of the line patterns is described by the above formula (1). Line patterns each having M strokes, $N_p$ primitive sequences and $N_s$ singular points are classified into a class I. This class I is denoted by the following formula (7).

$$Q(I) = (M^{(I)}, N_p^{(I)}, N_s^{(I)}, C^{(I)}, \pi^{(I)}, st^{(I)}, \sigma^{(I)}, mp^{(I)}, ms^{(I)}) \quad (7)$$

In a case of a line pattern shown in FIG. 9 (the numeral "8"), $$M=1, N_p=2, \text{ and } N_s=1,$$

and $$C = [1 \overset{h}{-} 2, 1 \overset{t}{-} 2]$$

where C is one of the types of connection of primitive sequences. is a function of a set of labels which can be provided for the primitive sequences, and is, for example, as follows.

$$\pi^{(I)}(1) = [<3, 0>, <4, 3>], \pi^{(I)}(2) = [<3, 2>, <4, 1>]$$

The function st is denotes a characteristic of each stroke to which each primitive belongs, and has, for example, the following value.

$$st(1)=st(2)=1.$$

The $\pi^{(I)}$ denotes a structure of each of the singular points, and is for example, as follows.

$$\sigma(1) =$$

$$\{[1, h] \overset{x}{-} [1, t], [1, h] \overset{x}{-} [2, t], [2, h] \overset{x}{-} [2, t], [2, h] \overset{x}{-} [1, t]\}$$

In addition, when $mp^{(I)}(i)=0$ for the primitive sequence i, the primitive sequence i is defined as an additional primitive sequence which may not always belong to the class I. When $ms^{(I)}(i)=0$ for the singular point i, the singular point i is defined as an additional singular point which may not always belong to the class I. Further, when $ms^{(I)}(i)=1$ for the singular point, the singular point i is defined as an indispensable singular point which is always formed by a coupling of corresponding primitive sequences. In the case of the line pattern shown in FIG. 9, $$mp^{(I)}(1)=mp^{(I)}(2)=ms^{(I)}(1)=1.$$

A description will now be given of a condition which should be satisfied by the function $\pi(i)$ for the primitive sequence i and a condition which should be satisfied by the function $\tau(j)$ for the singular point j.

DEFINITION

A set D(i,n), for the primitive sequence i, is defined as follows.

$$D(i,n) = [<n,id> \epsilon \pi(i)]$$

The function $\pi(i)$ for the primitive sequence i satisfies the following P-condition comprises of four sub-conditions: (P-1), (P-2), (P-3) and (P-4).

(P-1)
If a label <0,0> belongs to the function $\pi(i)$, $$\pi(i)=[<0,0>].$$

(P-2)
If a label <1,id> belongs to the function $\pi(i)$ where $id \epsilon [0,1,2,3]$, $$\pi(i) \leq [<1,j> | j \epsilon 0,1,2,3].$$

As a curve having either label <0,0> or <1,*> is special, the sub-conditions (P-1) and (p-2) describe that classes of the curve having either special label <0,0> or <1,*> and the curve having a normal label <n,*> ($n \geq 2$) are distinguished from each other.

(P-3)

$$|D(i,n)| \leq 2$$

This condition describes that the number of primitive sequences in the same class having labels in which the parameters ps are equal to each other is less than or equal to two.

In addition, if D(i,n)=2, two labels <n,id$_1$> and <n,id$_2$> satisfy the following formula.

$$id_1 = id_2 \pm 1 \pmod{4}.$$

This condition describes that two primitive sequences are sequentially transformed to each other by a small rotation.

(P-4)
The minimum value $\mu(i)$ and the maximum value M(i) for the primitive sequence i are defined as follows.

$$\mu(i) = \min [n | D(i,n) \neq o]$$

$$M(i) = \max [n D(i,n) \neq o]$$

If $\mu(i) \geq 2$, the primitive sequences belonging to $\pi(i)$ can be sequentially transformed into each other, as shown in FIGS. 10 through 13.

In addition, each primitive sequence having a label <ps,m>, where $$<ps, m> \epsilon \pi(i) \quad (\mu(i) \leq ps < M(i))$$

can be sequentially transformed into a primitive sequence having a label <ps+1,n>, $$<ps+1,n> \epsilon \pi(i).$$

Each primitive sequence having a label <ps+1,m>, $$<ps + 1, n > \epsilon \pi(i) \quad (\mu(i) \leq ps < M(i))$$

can be sequentially transformed into a primitive sequence having a label <ps,m>, where $$<ps,m> \epsilon \pi(i).$$

Figure 15A:
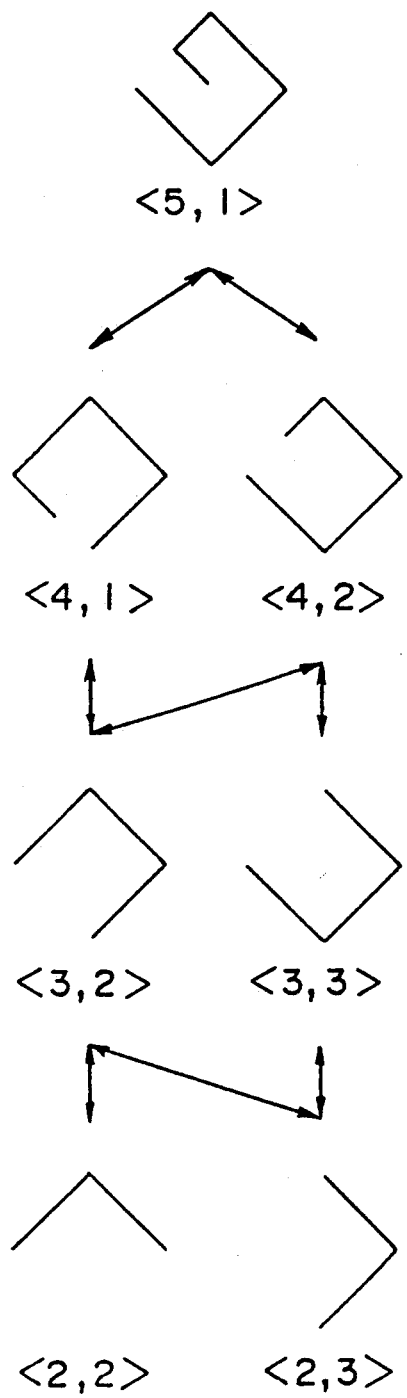
FIGS. 15A and 15B are diagrams illustrating primitive sequences capable of being sequentially transformed into each other.

FIG. 15A shows a set of primitive sequences satisfying the above sub-conditions (P-3) and (P-4). In this case, the function $\pi(i)$ is formed as follows.

$$\pi(i) =$$

-continued
[<2, 2>, <2, 3>, <3, 2>, <3, 3>, <4, 1>, <4, 2>, <5, 1>]

The line patterns, formed of primitive sequences having above labels, can be classified into the same class.

Figure 15B:
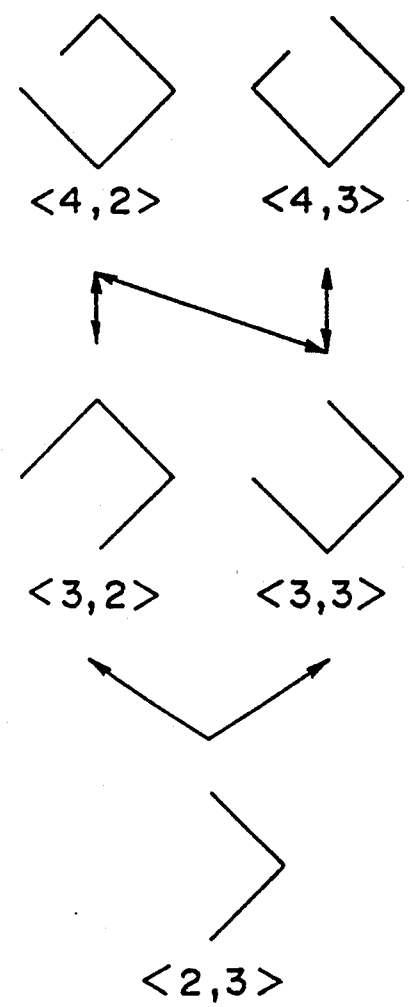

FIG. 15B also shows a set of primitive sequences satisfying the above sub-conditions (P-3) and (P-4). In this case, the function $\pi(i)$ is formed as follows.

$$\pi(i) = [<2, 3>, <3, 2>, <3, 3>, <4, 2>, <4, 3>]$$

DEFINITION

A set $E(j, m, \chi, n)$ for the singular point j is defined as follows.

$$E(j,m,\chi, n) = \{[m,p] \overset{x}{-} [n,q] \mid p, q \in \{hp,h,o,t,tp\}\} \leq \tau(j)$$

where $\chi \in [X, K, T]$ and $m \leq n$.

DEFINITION

A set $Lat(j,m,n)$ for the singular point j is defined as follows.

$$Lat(j,m,n) = \{(pcode^{(m)}(p), pcode^{(n)}(q)) \mid [m,p] - [n,q]\} \cup$$
$$\{(pcode^{(m)}(p), pcode^{(n)}(q)) \mid [n,p] - [m,q]\}$$
$$\{(x,y) \mid x,y : \text{integer}, -2 \leq x,y \leq 2\},$$

where $m \leq n$.

In the set $Lat(j,m,n)$, the structure of the singular point denoted by (x,y) can be transformed to only the structure of a singular point denoted by either $(x \pm 1, y)$ or $(x, y \pm 1)$.

The function $\tau(j)$ for the primitive sequence j satisfies the following S-condition which is formed of four sub-conditions (S-1), (S-2), (S-3) and (S-4).

(S-1)

If $E(j, m, K, n) \neq o$, $E(j, m, X, n) = E(j, m, T, n) = \phi$ stands.

(S-2)

If $E(j, m, X, n) \neq o$ or $E(j, m, T, n) = \phi$, $E(j, m, K, n) = \phi$ stands.

The sub-conditions (S-1) and (S-2) describe that the structures of the X-type and T-type singular points can be sequentially transformed into each other. The structures of X-type and T-type singular points cannot be sequentially transformed into the structures of the K-type singular point and vice versa.

(S-3)

If $m \neq n$, $Lat(j,m,n)$ includes only one coupling set. The coupling set is defined as a set of structures of the singular point which can be sequentially transformed into each other. That is, in the coupling component, points corresponding to the structure of the singular point are sequentially coupled to each other, as shown in FIGS. 14A and 14B. The sub-condition (S-3) describes that the structures of the singular point belonging to the function $\tau(j)$ can be sequentially transformed into each other.

(S-4)

If $m = n$, $Lat(j,m,n)$ includes either only one coupling set or two coupling sets. If $Lat(j,m,n)$ includes two coupling sets, the two coupling sets are positioned at positions symmetrical, about a line $x = y$, on the two dimensional lattice shown in FIGS. 14A and 14B.

EXAMPLE

FIGS. 16 through 18 show examples of the function $\tau(i)$ satisfying the S-condition. In FIG. 16 which shows four line patterns (a), (b), (c) and (d) each formed of two primitive sequences m and n, the set $E(i,m,T,n)$ is determined as follows.

$$E(i, m, T, n) = \{[m, tp] \overset{T}{-} [n, h], [m, t] \overset{T}{-} [n, hp],$$
$$[m, o] \overset{T}{-} [n, hp], [m, tp] \overset{T}{-} [n, o]$$

Figure 19:
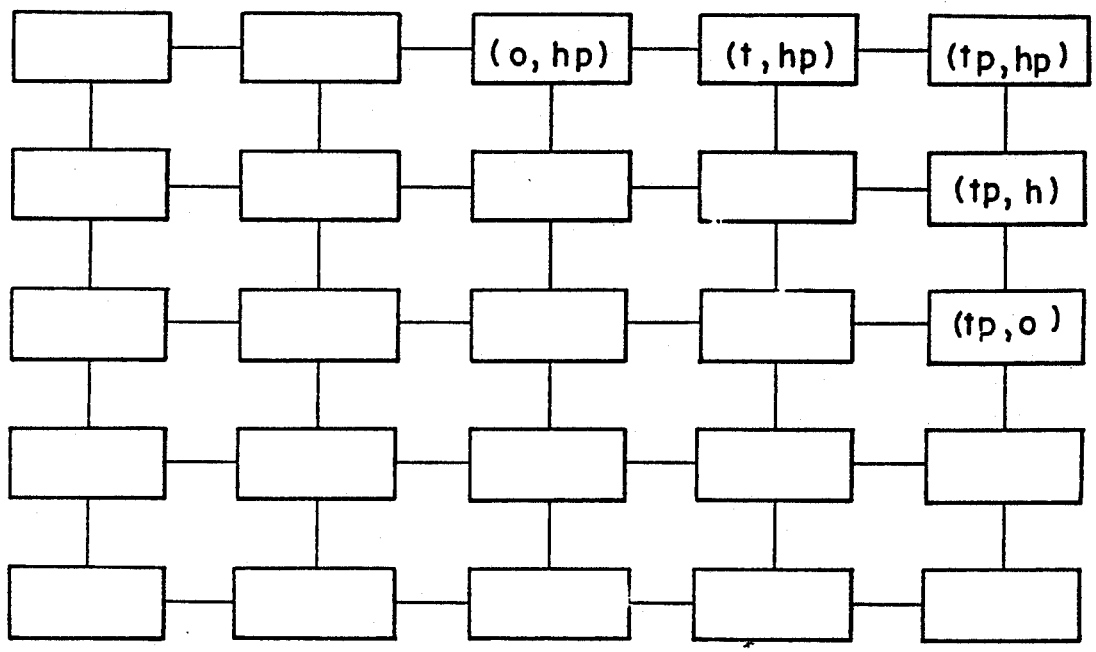
FIG. 19, 20 and 21 are diagrams illustrating points corresponding to the structures of the singular points shown in FIGS. 16, 17 and 18.

In this case, the sequential transformation of the structure of singular point is shown in FIG. 19.

In FIG. 17 which shows five line patterns (a), (b), (c), (d) and (e) each formed of two primitive sequences m and n, the sets $E(i,m,X,n)$ and $E(i,m,T,n)$ are determined as follows.

$$E(i, m, X, n) = \{[m, o] \overset{X}{-} [n, 0], [m, h] \overset{X}{-} [n, o]\}$$

$$E(i, m, T, n) = \{[m, hp] \overset{T}{-} [n, o], [m, h] \overset{T}{-} [n, hp]$$

$$[m, o] \overset{T}{-} [n, hp]\}$$

Figure 20:
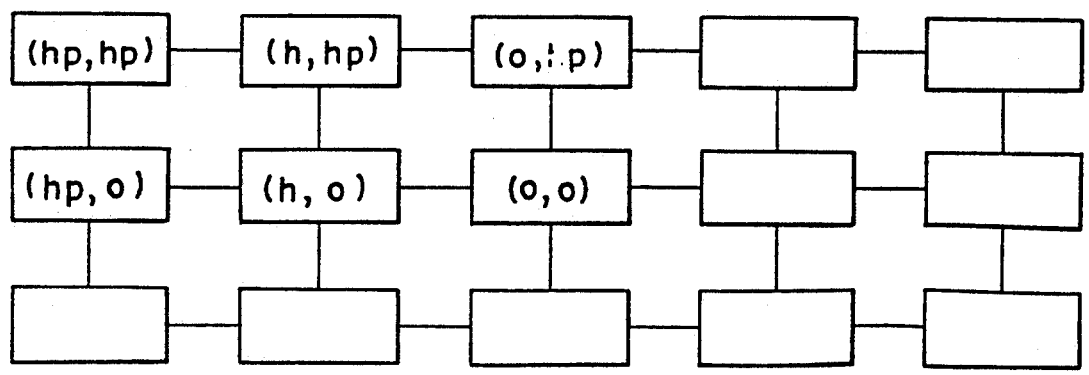

In this case, the primitive sequence n is formed of only one primitive, and the sequential transformation of the structure of the singular point is shown in FIG. 20.

In FIG. 18 which shows line patterns (a), (b), (c), (d) and (e) each formed of one primitive sequence, the sets $E(i,m,T,m)$ and $E(i,m,X,m)$ are determined as follows.

$$E(i, m, T, m) = \{[m, t] \overset{T}{-} [m, hp], [m, o] \overset{T}{-} [m, hp]\}$$

$$E(i, m, X, m) = \{[m, t] \overset{X}{-} [n, h], [m, o] \overset{X}{-} [m, h]$$

$$[m, t] \overset{X}{-} [n, o]\}$$

Figure 21:
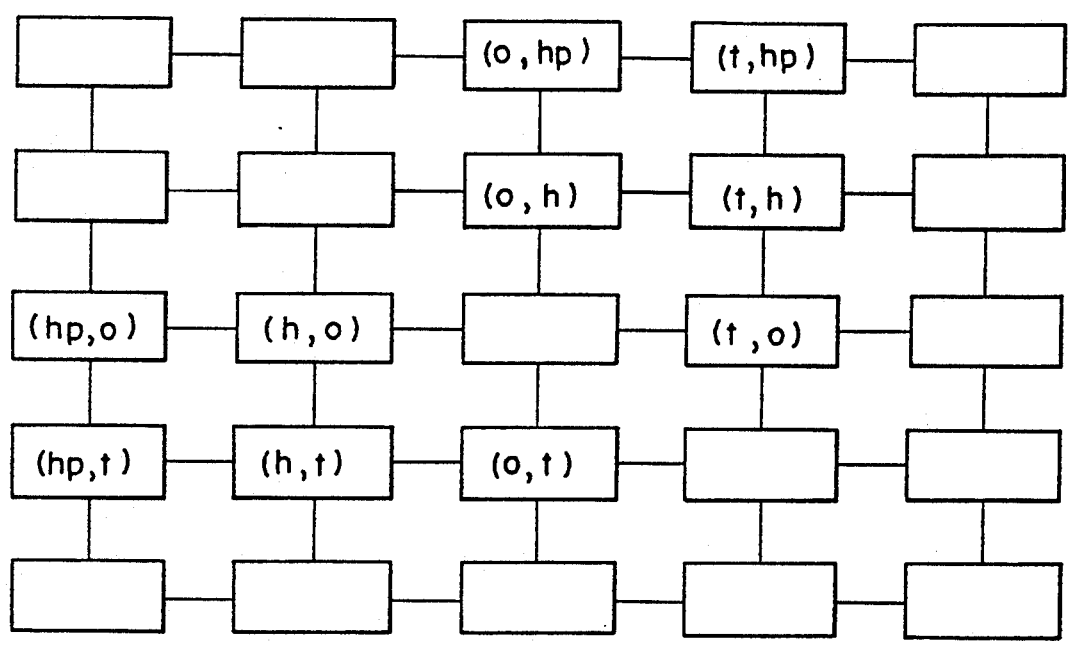

In this case, the sequential transformation of the structure of the singular point is shown in FIG. 21.

(3) Automatic construction of the dictionary

In the above chapter (2), a method for classifying line patterns of characters has been discussed. In this chapter, a description will be given of a method for automatically constructing a dictionary of character line patterns.

The dictionary is constructed by a combination operation for hierarchically combining classes of line patterns which satisfy combination conditions as will be described later. Each of these classes is formed as per the above formula (7). When any classes in the dictionary do not satisfy the combination conditions, the combination operation is completed. At this time, the dictionary is completely constructed.

The CPU 1 shown in FIG. 1 carries out the combination operation in accordance with a program described by the C-language, for example, as follows.

```
flg=1;
while (flg){
 flg=0;
 for(i=0;i<nclass;i++){
  for(j=0;j<nclass;j++){
   if(i≠j&&class[i].matched >0&&class[j].matched>0&&
    mergeconditionsatisfied(class[j],class[i]){
    /*then merge class[j]toclass[i]*/
    flg=1;
    mergeclass(class[j],class[i]);
    class[i].matched+=class[j].matched;
    class[j].matched=0
   }
  }
 }
}
```

The construction of the dictionary is incrementally and hierarchically carried out to prevent the classification from being in error and to prevent noise from being generated. The combination operation for constructing the dictionary has the following three steps.

First Step

In a case where first and second classes have the same general formation (only the functions $\pi^{(I)}$ regarding the label of the primitive sequence differ from each other), the first and second classes are combined with each other so that a new class is generated if the P-condition regarding the primitive sequence is satisfied in the new class.

Second Step

In a case where first and second classes have the same general formation (the functions $\pi^{(I)}$ differ from each other, and the functions $\tau^{(I)}$ point also differ from each other), the first and second classes are combined with each other so that a new class is generated if the P-condition and the S-condition are satisfied in the new class.

Third Step

In a case where the formation of a first class is a part of the formation of the second class, the first and second classes are combined so that a new class is generated if the P-condition and S-condition are satisfied in the new class.

In the first and second step, $mp^{(I)}$ is equal to one ($mp^{(I)}=1$) for every primitive sequence, and $ms^{(I)}$ is also equal to one ($ms^{(I)}=1$) for every singular point.

The combination operation is carried out in accordance with the first, second and third steps in this order.

A detailed description will now be given of the combination operation in each of steps.

First Step

If the following conditions (M-1), (M-2) and (M-3) are satisfied and mappings f and g, by which classes I and J are coupled to each other, can be discovered, the classes I and J are combined with each other so that a new class IJ is generated. The mapping f couples the class I to the class J so that the primitive sequences in the class I have one to one correspondence with the primitive sequences in the class J. The mapping g couples the class I to the class J so that the singular points in the class I have one to one correspondence with the singular points in the class J. That is, $$N_p(I) = N_p(J), N_s(I) = N_s(J)$$

and $$f: [1, 2, \ldots, N_p^{(I)}] \to [1, 2, \ldots, N_p^{(J)}]$$

$$g: [1, 2, \ldots, N_s^{(I)}] \to [1, 2, \ldots, N_s^{(J)}].$$

(M-1)

The components of $C^{(I)}$ in the class I have one to one correspondence with the components of $C^{(J)}$ in the class J. That is, the class J has the same connection of the primitive sequences as the class I, where $$C(J) = [f(m) - f(n)m - n \epsilon C(I)]$$

and $\alpha$ is either h or t.

(M-2)

In the new class formed by the combination of the classes I and J, a set of labels describing the primitive sequences satisfies the P-condition.

(M-3)

The singular points in the class I have one to one correspondence with the singular points in the class J, and a singular point in the class I has the same structure as a corresponding singular point in the class J.

$$\sigma^{(J)}(g(i)) = \{[f(m),pm] \stackrel{X}{-} [f(n),pn] | [m,pm] \stackrel{X}{-} [n,pn] \epsilon \sigma^{(I)}(i)$$

EXAMPLE

It is assumed that a line pattern having primitive sequences 1, 2, and 3 as shown in FIG. 22 (a) belongs to the class I and a line pattern having primitive sequences 1, 2, and 3 as shown in FIG. 22 (b) belongs to the class J.

In this case, the class I is defined as follows.

$$Q(I) = (1,3,0,C^{(I)},\pi^{(I)},st^{(I)},mp^{(I)},ms^{(I)})$$

where $$C^{(I)} = [1 \stackrel{t}{-} 2, 2 \stackrel{h}{-} 3],$$

$$\pi^{(I)}(1) = [<3, 2>], \pi^{(I)}(2) = [<2, 1>],$$

$$\pi^{(I)}(3) = [<3, 3>],$$

$$st^{(I)}(1) = st^{(I)}(2) = st^{(I)}(3) = 1,$$

and $$mp^{(I)}(1) = mp^{(I)}(2) = mp^{(I)}(3) = 1.$$

The class J is defined as follows.

$$Q(J) = (1,3,0,C^{(J)}, \pi^{(J)},st^{(J)}, mp^{(J)},ms^{(J)})$$

where $$C^{(J)} = [1 \stackrel{t}{-} 2, 2 \stackrel{t}{-} 3],$$

$$\pi^{(J)}(1) = [<3, 2>], \pi^{(J)}(2) = [<3, 0>],$$

$$\pi^{(J)}(3) = [<4, 2>],$$

$$st^{(J)}(1) = st^{(J)}(2) = st^{(J)}(3) = 1,$$

and

-continued $$mp^{(J)}(1) = mp^{(J)}(2) = mp^{(J)}(3) = 1.$$

As the line patters shown in FIG. 22 (a) and (b) have no singular point, the class I and J satisfy the above conditions (M-1), (M-2) and (M-3). In addition a mapping f, coupling the primitive sequences (1,2,3) in the class I to those in the class J in the following manner, can be discovered.

$$f: \begin{bmatrix} 1 \to 1 \\ 2 \to 2 \\ 3 \to 3 \end{bmatrix}$$

In this case, the new classes IJ obtained by the combination of the classes I and J is defined as follows.

$$Q(IJ) = (1, 3, 0, C^{(IJ)}, \pi^{(IJ)}, st^{(IJ)}, mp^{(IJ)}, ms^{(IJ)})$$

where $$C^{(IJ)} = [1 \overset{t}{-} 2, 2 \overset{t}{-} 3],$$

$$\pi^{(IJ)}(1) = [<3, 2>], \pi^{(IJ)}(2) = [<2, 1>, <3, 0>],$$

$$\pi^{(IJ)}(3) = [<3, 3>, <4, 2>],$$

$$st^{(IJ)}(1) = st^{(IJ)}(2) = st^{(IJ)}(3) = 1,$$

and $$mp^{(IJ)}(1) = mp^{(IJ)}(2) = mp^{(IJ)}(3) = 1.$$

Second Step

If the above conditions (M-1) and (M-2) and the following conditions (M-4) and (M-5) are satisfied and mappings f and g by which classes I and J are coupled to each other can be discovered, the classes I and J are combined with each other so that a new class IJ is generated. The mapping f couples the class I to the class J so that the primitive sequences in the class I have one to one correspondence with the primitive sequences in the class J. The mapping g couples the class I to the class J so that the singular points in the class I have one to one correspondence with the singular points in the class J. That is, $$N_p(I) = N_p(J), N_s(I) = N_s(J)$$

and $$f: [1, 2, \ldots, N_p^{(I)}] - [1, 2, \ldots, N_p^{(J)}]$$

$$g: [1, 2, \ldots, N_s^{(I)}] - [1, 2, \ldots, N_s^{(J)}].$$

(M-4)

m and $n(\epsilon[1, 2, \ldots, N_p^{(I)})$ satisfy $$E^{(I)}(i, m, \chi, n) \neq o \text{ and}$$

$$E^{(J)}(g(i), f(m), \chi, f(n)) \neq o.$$

(M-5)

In the new class IJ is obtained through the combination of the classes I and J, a set of the structures of the singular points satisfies the S-condition. That is, the function (I)

$$\sigma^{(I)}(i)$$

$$\cup [f^{-1}(m), pm] \overset{X}{-} [f^{-1}(n), pn] | [m, pm] \overset{X}{-} [n, pn] \epsilon$$

$$\sigma^{(J)}(g(i))$$

satisfies the S-condition.

EXAMPLE

It is assumed that a line pattern having a primitive sequence 1 as shown in FIG. 23 (a) belongs to the class I and a line pattern having a primitive sequence 1 in FIG. 23 (b) belongs to the class J.

In this case, the class I defined as follows.

$$Q(I) = (1, 1, 1, C^{(I)}, \pi^{(I)}, st^{(I)}, \sigma^{(I)}, mp^{(I)}, ms^{(I)})$$

where $$C^{(I)} = \phi,$$

$$\pi^{(I)}(1) = [<4, 3>, <5, 2>],$$

$$\sigma^{(I)} = [1, hp] \overset{T}{-} [1, t],$$

$$st^{(I)}(1) = 1, \text{ and}$$

$$mp^{(I)}(1) = ms^{(I)}(1) = 1.$$

The class J is defined as follows.

$$Q(J) = (1, 1, 1, C^{(J)}, \pi^{(J)}, st^{(J)}, \sigma^{(J)}, mp^{(J)}, ms^{(J)})$$

where $$C^{(J)} = \phi$$

$$\pi^{(J)}(1) = [<4, 3>, <5, 2>],$$

$$\sigma^{(J)} = [1, hp] \overset{X}{-} [1, t],$$

$$st^{(J)}(1) = 1, \text{ and}$$

$$mp^{(J)}(1) = ms^{(J)}(1) = 1.$$

Thus, the mappings f and g $$f: 1 \to 1, g: 1 \to 1$$

are discovered between the classes I and J which satisfy the conditions (M-1), (M-2), (M-4) and (M-5). The new class IJ obtained through the combination of the classes I and J is defined as follows.

$$Q(IJ) = (1, 1, 1, C^{(IJ)}, \pi^{(IJ)}, st^{(IJ)}, \sigma^{(IJ)}, mp^{(IJ)}, ms^{(IJ)})$$

where $$C^{(IJ)} = \phi,$$

$$\pi^{(IJ)}(1) = [<4, 3>, <5, 2>],$$

$$\sigma^{(IJ)} = [1, h] \overset{X}{-} [1, t], [1, hp] \overset{T}{-} [1, t],$$

$$st^{(IJ)}(1) = 1, \text{ and}$$

$$mp^{(IJ)}(1) = ms^{(IJ)}(1) = 1.$$

Third Step

If the formation of the class J is a part of the formation of the class I and the primitive sequences and the singular points in a new class IJ satisfy the P-condition and the S-condition, the classes I and J are combined with each other so that the new class IJ is generated. That is, if the mappings (surjections) f and g satisfy the above conditions (M-2), (M-4) and (M-5) and the following conditions (M-6), (M-7), (M-8) and (M-9) are discovered, the classes I and J are combined with each other. The mappings f and g are respectively denoted by the following formulas, $$f: [1,2,\ldots,N_p^{(I)}] - [1,2,\ldots,N_p^{(J)}] \cup [\phi]$$

$$g: [1,2,\ldots,N_s^{(I)}] - [1,2,\ldots,N_s^{(J)}] \cup [\phi]$$

where $[\phi]$ indicates a set having non-corresponding components.

(M-6)

If the class J has primitive sequences corresponding to primitive sequences connected to each other in the class I, elements of $C^{(I)}$ have one to one correspondence with elements of $C^{(J)}$. That is, the following formula stands.

$$C(J) = [f(m) - f(n) | m-n \epsilon C(I), f(m) \neq o, f(n) = \phi]$$

(M-7)

If the class J has an indispensable primitive sequence, the class I has a primitive sequence corresponding to the indispensable primitive sequence in the class J. That is, if $mp^{(J)}(j)=1$, some $i [1,2,\ldots,N_p^{(I)}]$ satisfies $f(i)=j$.

(M-8)

If the class J has an indispensable singular point, the class I has a singular point corresponding to the indispensable singular point in the class J. That is, if the following formulas stand, $$ms^{(J)}(j) = 1,$$

$$f(m) \neq o, \text{ and } f(n) = \phi,$$

some $i[1, 2, \ldots, N_s^{(I)}]$ satisfies $g(i) = j.$ (M-9)

The strokes belonging to the class I have one to one correspondence with the strokes belonging to the class J. That is, if $$f(m) \neq o \text{ and } f(m) = \phi,$$

$$st^{(I)}(m) = st^{(I)}(n)$$

stand in only a case where $$st^{(J)}f(m) = st^{(J)}f(n) \text{ stands.}$$

If the mappings f and g satisfying the condition (M-9) are discovered, $mp^{(I)}(i)=0$ stands with respect to the primitive sequence i satisfying $f(i)=\phi$, and $ms^{(I)}(i)=0$ stands with respect to the singular point i satisfying $g(i)=\phi$.

EXAMPLE

It is assumed that a line pattern having a primitive sequence 1 as shown in FIG. 24 (b) belongs to the class I and a line pattern having primitive sequences 1 and 2 shown in FIG. 24 (a) belongs to the class J.

In this case, the class I is defined as follows.

$$Q(I) = (2, 2, 1, C^{(I)}, \pi^{(I)}, st^{(I)}, \sigma^{(I)}, mp^{(I)}, ms^{(I)})$$

where $$C^{(I)} = \phi,$$

$$\pi^{(I)}(1) = [<2, 3>, <3, 2>],$$

$$\pi^{(I)}(2) = [<1, 3>, <1, 0>],$$

$$\sigma^{(I)} = \{[1, t] \overset{x}{-} [2, o]\},$$

$$st^{(I)}(1) = 1, st^{(I)}(2) = 2, \text{ and}$$

$$mp^{(I)}(1) = mp^{(I)}(2) = ms^{(I)}(1) = 1.$$

The class J is defined as follows.

$$Q(J) = (1, 1, 0, C^{(J)}, \pi^{(J)}, st^{(J)}, \sigma^{(J)}, mp^{(J)}, ms^{(J)})$$

where $$C^{(J)} = \phi$$

$$\pi^{(J)}(1) = [<2, 3>, <3, 2>],$$

$$st^{(J)}(1) = 1, \text{ and}$$

$$mp^{(J)}(1) = 1.$$

Thus, the mappings f and g $$f: \begin{array}{c} 1 \to 1, \\ 2 \to \phi \end{array}$$

$$g: 1 \to 1$$

are discovered between the classes I and J. The new class IJ obtained by the combination of the classes I and J is defined as follows.

$$Q(IJ) = (2, 2, 1, C^{(IJ)}, \pi^{(IJ)}, st^{(IJ)}, \sigma^{(IJ)}, mp^{(IJ)}, ms^{(IJ)})$$

where $$C^{(IJ)} = \phi,$$

$$\pi^{(IJ)}(1) = [<2, 3>, <3, 2>],$$

$$\pi^{(IJ)}(2) = [<1, 3>, <1, 0>],$$

$$\sigma^{(IJ)} = \{[1, t] \overset{x}{-} [2, 0]\},$$

$$st^{(IJ)}(1) = 1, st^{(IJ)}(2) = 2,$$

$$mp^{(IJ)}(1) = 1, mp^{(IJ)}(2) = 0, \text{ and}$$

$$ms^{(IJ)}(1) = 1.$$

The present invention is not limited to the aforementioned embodiments, and variations and modifications may be made without departing from the scope of the claimed invention.

What is claimed is:

1. A method for classifying character line patterns in a dictionary of a character recognition system operating by recognizing characters using structural information of the characters, the character recognition system including an input device, a processing portion, and a memory in which the dictionary is formed, said method comprising the steps of:

(a) obtaining a first class to which one or a plurality of first line patterns belongs, the first line patterns being related to characters having been input through the input device to determine the first line patterns stored in the memory;

(b) obtaining a second class to which one or a plurality of second line patterns belongs, the second line patterns being related to characters having been input through the input device to determine the second line patterns stored in the memory;

wherein each of the first and second line patterns is characterized by respective structural information;

(c) using the processing portion, determining whether or not the structural information of the first line pattern and the structural information of the second line pattern are similar to each other, in accordance with a predetermined rule which is applied to the structural information by the processing portion; and (d) when said step (c) determines that the structural information of the first line pattern and the structural information of the second line pattern are similar, using the processing portion to carry out a step of combining said first class and said second class so as to form a new class to which the first and second line patterns belong so that line patterns stored in the dictionary may be stored in the memory differently than before said step (d) because of said formation of said new class.

2. A method as claimed in claim 1, wherein the structural information by which each of the first and second line patterns is characterized includes information described by using one or a plurality of primitive sequences on each of strokes forming each of the first and second line patterns, each of the primitive sequences being formed of primitives and each of the primitives being a monotone curve, the monotone curve being a curve which is either non-increasing or non-decreasing.

3. A method as claimed in claim 1, wherein the structural information by which each of the first and second line patterns is characterized includes information described by using a singular point which is a point at which a line segment intersects another in the line pattern.

4. A method as claimed in claim 2, wherein said step (c) has a step of determining whether or not the structural information of the first line pattern and the structural information of the second line pattern are similar to each other in accordance with a rule in which each of the primitive sequences forming the first line pattern is similar to a corresponding one of the primitive sequences forming the second line pattern.

5. A method as claimed in claim 3, wherein said step (c) has a step of determining whether or not the structural information of the first line pattern and the structural information of the second line pattern are similar to each other in accordance with a rule in which a structure of the singular point on the first line pattern is similar to a structure of the singular point on the second line pattern, the structure of the singular point being described by line segments which crosse each other at the singular point.

* * * * *